United States Patent [19]
Brarens et al.

[11] Patent Number: 6,020,584
[45] Date of Patent: Feb. 1, 2000

[54] METHOD OF MEASURING THE POLARIZATION MODE DISPERSION OF AN OPTICAL WAVEGUIDE DEVICE

[75] Inventors: John Eugene Brarens, Lindley; Dipakbin Qasem Chowdhury, Corning; Edward Francis Murphy, Painted Post; Andrew David Robinson, Newfield, all of N.Y.

[73] Assignee: Corning Incorporated, Corning, N.Y.

[21] Appl. No.: 09/023,477

[22] Filed: Feb. 13, 1998

Related U.S. Application Data

[60] Provisional application No. 60/038,026, Feb. 14, 1997.

[51] Int. Cl.$^7$ .................................................. G01J 4/00
[52] U.S. Cl. ............................. 250/227.17; 250/227.14; 250/225; 356/73.1
[58] Field of Search ...................... 250/227.17, 227.16, 250/227.14, 227.11, 225, 231.1; 356/73.1, 351

[56] References Cited

U.S. PATENT DOCUMENTS

| | | | |
|---|---|---|---|
| 5,361,319 | 11/1994 | Antos et al. | 385/123 |
| 5,555,340 | 9/1996 | Onishi et al. | 385/127 |
| 5,568,583 | 10/1996 | Akasaka et al. | 385/123 |
| 5,582,496 | 12/1998 | Gisin et al. | 356/345 |
| 5,654,793 | 8/1997 | Barlow et al. | 356/73.1 |
| 5,673,354 | 9/1997 | Akasaka et al. | 385/127 |

OTHER PUBLICATIONS

Corning Components, Product Information, Dispersion Compensator Module, P1739, Corning Incorporated, Feb. 1996.

Polarization Measurements of Signals and Components, Product Note 8509–1 Hewlett Packard, 1993.

Statistical Treatment of the Evolution of the Principal States of Polarization in Single–Mode Fibers, Journal of Lightwave Technology, vol. 8, No. 8, Aug. 1990, Curti et al.

Experimental Investigations of the Statistical Properties of Polarization Mode Dispersion in Single Mode Fibers, IEEE Photonics Technology Letters, vol. 5 No. 7, Jul. 1993, N. Gisin et al.

Dynamical equation for polarization dispersion, Optic Letters, vol. 16, No. 6, Mar. 15, 1991, p. 372–374, C.D. Poole et al.

Ultrafast optical fiber polarization–mode dispersion measurement using wavelength scanning technique, OFC '96 Technical Digest, p. 151–152, 1996 D.Q. Chowdury et al.

How Accurately Can One Measure a Statistical Quantity Like Polarization–Mode Dispersion?, IEEE Photonics Tech. Ltrs, vol. 8, No. 12, Dec. 1996, p. 1671–N. Gisin et al.

Numerical Recipes in C, The Art of Scientific Computing, 2nd Edition, Chpt. Statistical Description Data, p. 620–625, W.H. Press et al.

Polarization Mode Dispersion in a Single Mode Fiber, BW Hakki, Journal of Lightwave Technology, vol. 14, No. 10, Oct. 1996, p. 2202–2208.

Dispersion Compensating Modules, Lucent Technologies, May 1997.

Statistical Theory of Polarization Dispersion in Single Mode Fibers, Foschini and Poole, Journal of Lightwave Technology, vol. 9, No. 11, Nov. 1991 p. 1439–56.

(List continued on next page.)

*Primary Examiner*—Edward P. Westin
*Assistant Examiner*—Thanh X. Luu
*Attorney, Agent, or Firm*—Edward F. Murphy

[57] ABSTRACT

A method of measuring the polarization mode dispersion of a chromatic dispersion compensating optical waveguide device is provided. A force is applied multiple times to the spool flanges of a chromatic dispersion compensating optical waveguide device in order to obtain a plurality of polarization mode dispersion values which have a distribution characteristic of a Maxwellian distribution and provide a mean polarization mode dispersion value for the optical waveguide device.

21 Claims, 5 Drawing Sheets

OTHER PUBLICATIONS

Deterministic, Analytically Complete Measurement of Polarization–Dependent Transmission Through Optical Devices, Heffner, IEEE Photonics Technology Letters, vol. 4, No. 5, May 1992, p. 451–454.

Automated Measurement of Polarization Mode Dispersion Using Jones Matrix Eigenanalysis, Heffner, IEEE Photonics Technology Letters, vol. 4, No. 9, Sep. 1992, p. 1066–1069.

Measurement of the group–delay difference between the principal states of polarization on a low–birefringence terrestrial fiber cable, Optic Letters, vol. 12, No. 10, Oct. 1987, p. 844–846, D. Andresciani.

Phenomenological Approach to Polarisation Dispersion in Long Single Mode Fibres, Electronics Letters, Sep. 11, 1986, vol. 22, No. 19, p. 1029–1030, C.D. Poole et al.

Polarization Mode Dispersion of Short and Long Single–Mode Fibers, Journal of Lightwave Technology, vol. 9, No. 7, Jul. 1991, p. 821–827, N. Gisin et al.

Polarization Dispersion and Principal States in a 147–km Undersea Lightwave Cable, Journal of Lightwave Technology, vol. 6, No. 7, Jul. 1988, p. 1185–9 C.D. Poole et al.

Polarization Control of Coherent Communications, Journal of Lightwave Technology, vol. 8, No. 3, Mar. 1990, p. 438–458, N.G. Walker.

Techni–Tool, Catalog 59, 1997, p. 82 "Torque".

FITEL—Preliminary Data Sheet, Jan., 1998, by Furukawa Electric Co., Dispersion Flat Compensating fiber Module DFCM–0700 & DFCM–1400.

METHOD OF MEASURING THE POLARIZATION MODE DISPERSION OF AN OPTICAL WAVEGUIDE DEVICE

This application claims priority to U.S. Provisional Patent Application No. 60/038,026, filed on Feb. 14, 1997 the contents of which are relied upon and incorporated by reference.

BACKGROUND OF THE INVENTION

Field of Invention

The present invention relates to a method of measuring the polarization mode dispersion of an optical waveguide device. More particularly, the present invention relates to a method of qualifying the polarization mode dispersion characteristics of dispersion compensating optical waveguide devices.

SUMMARY OF THE INVENTION

The present invention is directed to a method of measuring optical performance that substantially obviates one or more of the problems due to limitations and disadvantages of the related art.

Fiber chromatic dispersion is one of the key impairments for long haul optical communication systems. A dispersion compensating optical waveguide device can be used to avoid the deleterious impact of dispersion in a long haul optical communication system. Dispersion compensating optical waveguide devices may be comprised of a length of optical waveguide fiber which is wound around a central hub having two flanges to provide a spool of optical waveguide fiber. The optical waveguide fiber is a dispersion compensating optical fiber in accordance with U.S. Pat. No. 5,361,319 by Antos et al. which is incorporated herein by reference. Preferably the optical waveguide fiber is in accordance with U.S. Pat. No. 4,715,679 by Bhagavatula which is incorporated herein by reference.

Such dispersion compensating optical waveguide devices have polarization mode dispersion (PMD) that can limit the data transmission rate or the distance over which data is transmitted in an optical communication system. The PMD of such an optical waveguide device is preferably characterized as a statistical variable which is Maxwell distributed. In addition to device to device variation, an individual device can undergo variation in time that is within the distribution of its PMD values. A Maxwell distribution is solely characterized by its mean value. It is important when an average PMD value for such a device is used to qualify the devices usefulness in a system, that the average PMD value closely and truly reflect its actual in use PMD characteristic when used as intended. Hence, the accurate measurement of average PMD of dispersion compensation optical waveguide devices and characterization as a Maxwellian distribution is essential for system PMD budget design in an optical communication system where PMD is managed and minimized.

A single measurement of PMD vs. wavelength over a 60 to 100 nm range in the 1550 nm optical communications window on a HP-8509 Polarization Analyzer only samples a small part of its possible PMD performance and does not accurately reflect the PMD the device will have during its intended use and lifetime. In order to sample the distribution better, in accordance with the invention, between 15 and 20 measurements are performed with intermediate mechanical perturbations. A mechanical perturbation is needed in order to change the random mode coupling within the dispersion compensating optical waveguide device which lead to the PMD distribution. The inventive mechanical perturbation was introduced by clamping the spool of the device near the flange's outer edge. After releasing the force introduced by the clamp, the fiber is allowed to relax. Then a PMD vs. wavelength measurement scan is done, preferably with an analyzer such as a HP-8509 Polarization Analyzer. PMD distribution is then generated from the measured data in order to ensure that the PMD distribution is characteristic of a Maxwellian distribution. The average PMD is then extracted from the 15 to 20 measurements. In order to improve the reliability and repeatability of the inventive method and to make sure that too much force was not introduced by the clamps, a torque screwdriver was used to limit the applied force. The torque screwdriver provided a means for consistently applying a desired force.

In order to introduce perturbation a temperature variation was first tried. However, such a temperature variation moved the distribution average when the temperature was cycled from one temperature to the next. Consequently, we came to conclude that temperature variation was not a suitable means for extracting the PMD statistics of the dispersion compensating optical waveguide device in that temperature variation provided multiple distributions with shifting distribution mean values.

Additional features and advantages of the invention will be set forth in the description which follows, and in part will be apparent from the description, or may be learned by practice of the invention. The objectives and other advantages of the invention will be realized and attained by the methods and systems particularly pointed out in the written description and claims hereof as well as the appended drawings.

To achieve these and other advantages and in accordance with the purpose of the invention, as embodied and broadly described, the invention includes the steps of providing an optical waveguide device comprised of a length of optical waveguide fiber wound under a tension on a spool and applying a force to the spool near the wound optical waveguide fiber. The inventive method further includes the steps of relieving the applied force and then measuring the polarization mode dispersion of the optical waveguide device to obtain a post mechanically perturbed polarization mode dispersion measurement value and recording such. The invention further includes repeating the steps of applying, relieving, measuring, and recording, in a cycle, in order to obtain a Maxwellian distribution of a plurality of recorded post mechanically perturbed polarization mode dispersion measurement values. The invention further includes extracting a mean polarization mode dispersion measurement value from the plurality of recorded measurement values.

In another aspect, the invention includes the steps of providing a spool having a center hub and at least one flange, winding a length of dispersion compensating optical waveguide fiber under tension around the hub to obtain multiple overlapping layers of optical waveguide fiber under tension, and elastically securing the wound length of fiber around the center hub of the spool. The invention further includes applying a repeatable consistent force to the flange of the spool proximate the outer layer of the overlapping layers of wound fiber and then terminating the application of force to the flange. The invention further includes measuring a polarization mode dispersion value of the optical waveguide fiber after terminating the application of force and cyclically repeating the applying, terminating, and measuring steps until the measured polarization mode dispersion values have a statistical distribution characteristic of a Maxwellian distribution, preferably where the Maxwellian distribution has a Kolmogrov-Smirnov Test value D less than or equal to 0.1.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

DETAILED DESCRIPTION

The inventive method of measuring the optical performance of an optical waveguide device for use in an optical telecommunications system comprises the steps of providing an optical waveguide device comprised of a length of optical waveguide fiber wound under a tension on a spool, preferably wherein the wound fiber is elastically secured on the spool by a radially outermost resilient layer, and applying a force to the spool proximate the wound optical waveguide fiber.

Reference will now be made in detail to the present preferred embodiments of the invention and examples of which are illustrated in the accompanying drawings.

Figure 1:
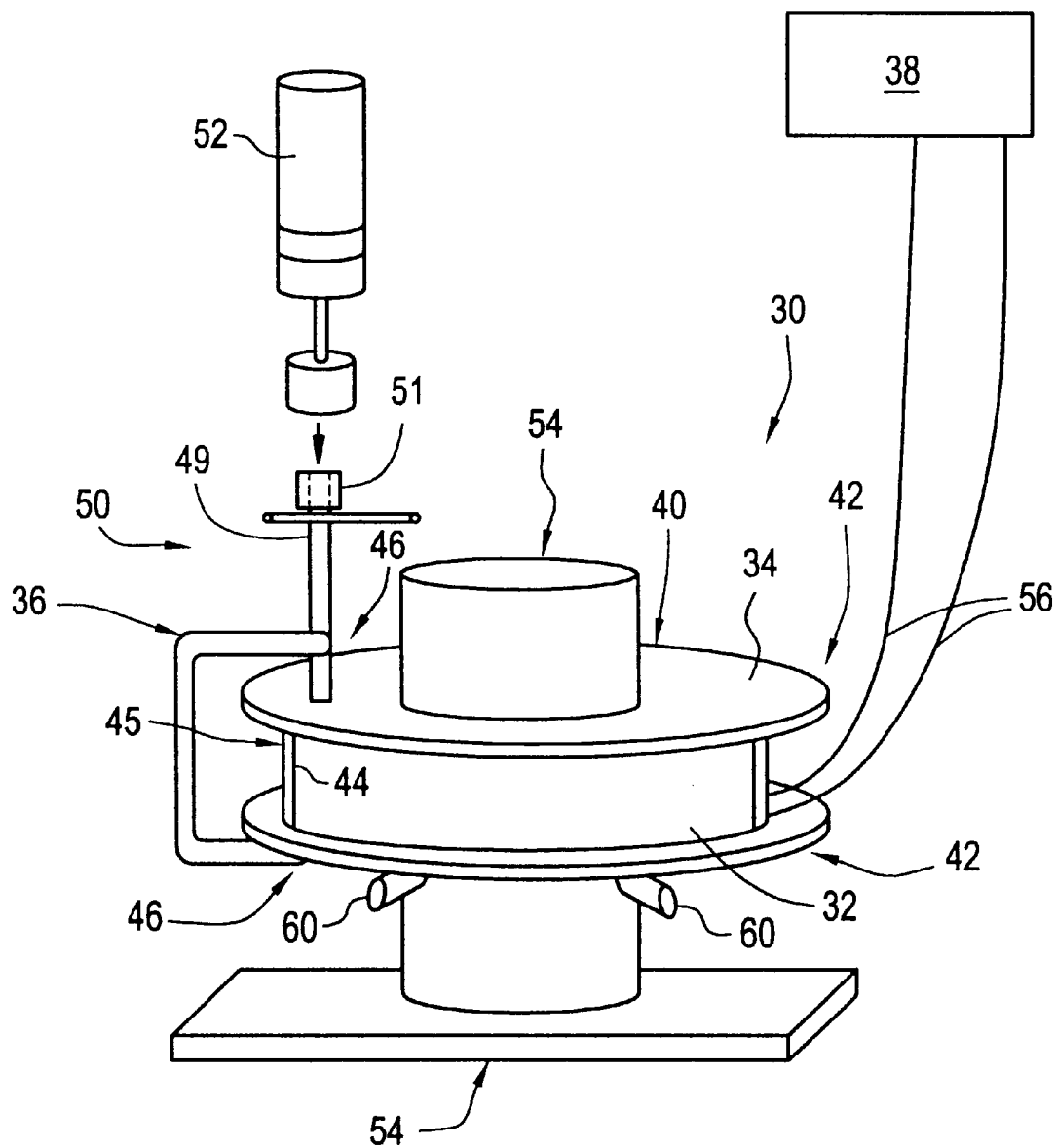
FIG. 1 illustrates the method and system of the invention.
Figure 4:
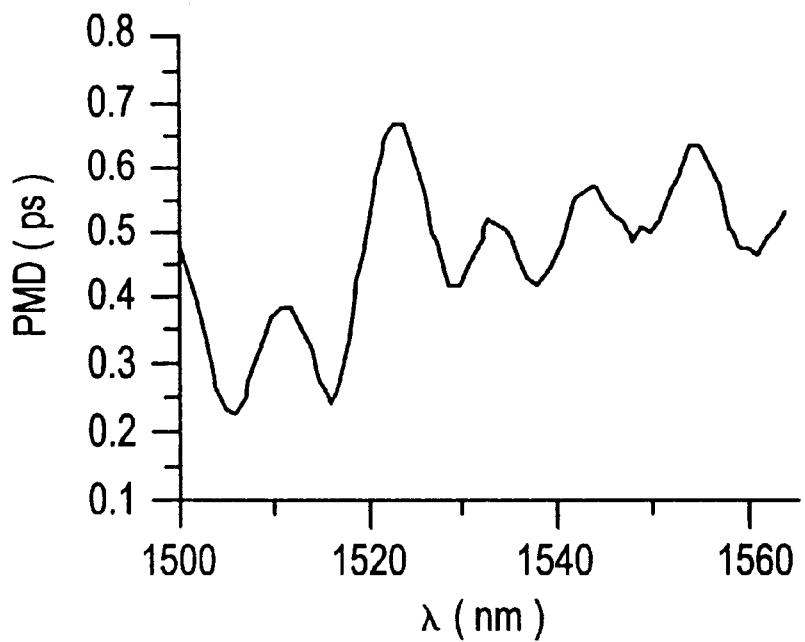
FIG. 4 is a post mechanically perturbed polarization mode dispersion measurement value plot in accordance with the invention.
Figure 5:
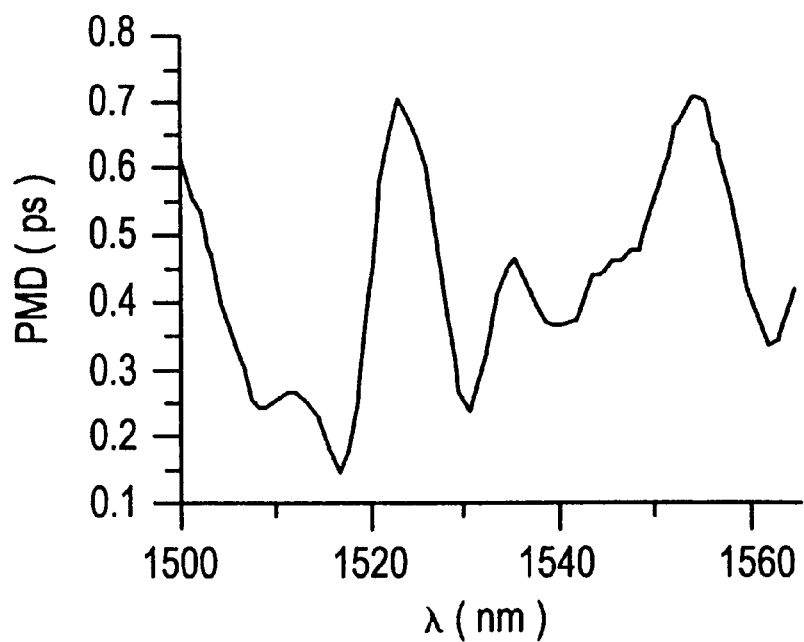
FIG. 5 is a post mechanically perturbed polarization mode dispersion measurement value plot in accordance with the invention.

The exemplary embodiment of the inventive method and qualification system of the present invention is shown in FIG. 1. As embodied herein and referring to FIG. 1, the inventive method of measuring an optical performance characteristic of an optical waveguide device includes the step of providing an optical waveguide device 30 which is comprised of a length of optical waveguide fiber 32 wound under a tension on spool 34. Spool 34 is preferably comprised of upper and lower flexible ductile flanges 42 attached to a rigid central hub 40. Rigid central hub 40 is preferably machined from a rigid material such as aluminum, stainless steel, or a glass-ceramic. Preferably upper and lower flexible ductile flanges 42 are thin, flexible, and ductile and are most preferably cut and/or machined from a thin ductile sheet material such as aircraft aluminum sheets. Preferably the thickness of flanges 42 is in the range of 0.020 to 0.1 inches, and most preferably is about 0.06 inches. Flexible flanges 42 are secured and attached to rigid hub 40 by such means as screws or other fixing means. The inventive method further includes the step of applying a force to spool 34 proximate the wound optical waveguide fiber 32. The force is applied so as to urge the outer edges of the flanges together. The preferred method of applying the force comprises clamping spool 34 with C-clamp 36. The method further includes the steps of relieving the force applied to the spool proximate the wound optical waveguide fiber and then measuring the polarization mode dispersion of the optical waveguide devices after the force is relieved, with polarization measuring device 38, to obtain a post mechanically perturbed polarization mode dispersion measurement value such as shown in FIG. 4 and FIG. 5. The method further includes recording the post mechanically perturbed polarization mode dispersion measurement value. The method includes repeating the steps of applying force to the spool, relieving the applied force, measuring the polarization mode dispersion after relieving the force, and recording the post mechanically perturbed polarization mode dispersion measurement value in order to obtain a Maxwellian distribution of a plurality of recorded post mechanically perturbed polarization mode dispersion measurement values. The method further includes extracting a mean polarization mode dispersion measurement value from the plurality of recorded post mechanically perturbed polarization mode dispersion measurement values, in order to obtain an average polarization mode dispersion value wherein the statistical distribution of the plurality of recorded post mechanically perturbed polarization mode dispersion measurement values is characteristic of a Maxwellian distribution.

Most preferably extracting a mean polarization mode dispersion measurement value from said plurality of recorded post mechanically perturbed polarization mode dispersion measurement values comprises extracting the mean polarization mode dispersion measurement value from a best fit Maxwellian distribution of the plurality of recorded post mechanically perturbed polarization mode dispersion measurement values.

Alternatively, extracting a mean polarization mode dispersion measurement value from said plurality of recorded post mechanically perturbed polarization mode dispersion measurement values may comprise extracting the mean polarization mode dispersion measurement value by statistically averaging the plurality of recorded post mechanically perturbed polarization mode dispersion measurement values.

Figure 2A:
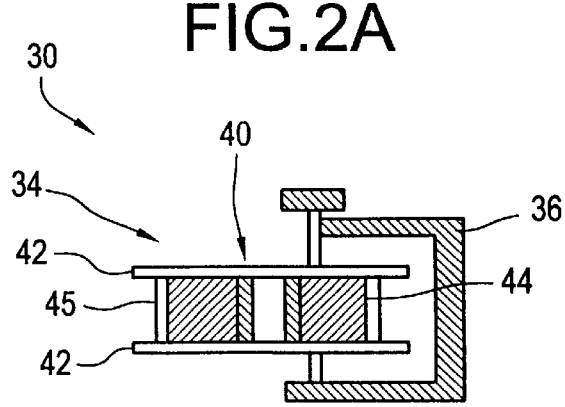
FIG. 2 provides a side and top view of a dispersion compensation optical waveguide device in accordance with the invention.
Figure 2B:
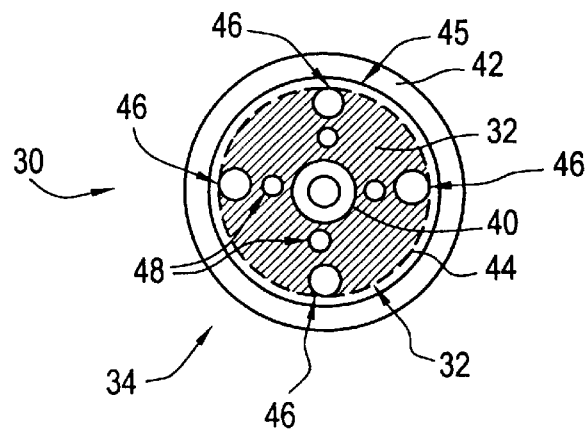

The inventive method is particularly suited for measuring the polarization mode dispersion optical performance characteristic of a dispersion compensating optical waveguide device 30 wherein the optical waveguide fiber 32 is dispersion compensating optical waveguide fiber which has a negative waveguide dispersion, and has either a negative or positive dispersion slope. Preferably the length of fiber 32 is in the range of 4 to 20 km, and most preferably in the range of 12–16 km. As shown in FIG. 2, the preferred method of providing an optical waveguide device further comprises providing spool 34 with a rigid center hub 40 and first and second thin ductile flexible flanges 42 wherein the length of fiber 32 is wound under a tension around center hub 40 in radially outward overlapping layers. Preferably length of fiber 32 is wound under a tension, preferably in the range of 40 to 80 grams, most preferably of at least 50 grams of winding tension at a winding speed of 3 m/sec, around center hub 40 and between flanges 42 in overlapping layers in order to provide a packing fraction greater than about 0.7, more preferably greater than about 0.8, and most preferably at least 0.85.

Figure 3:
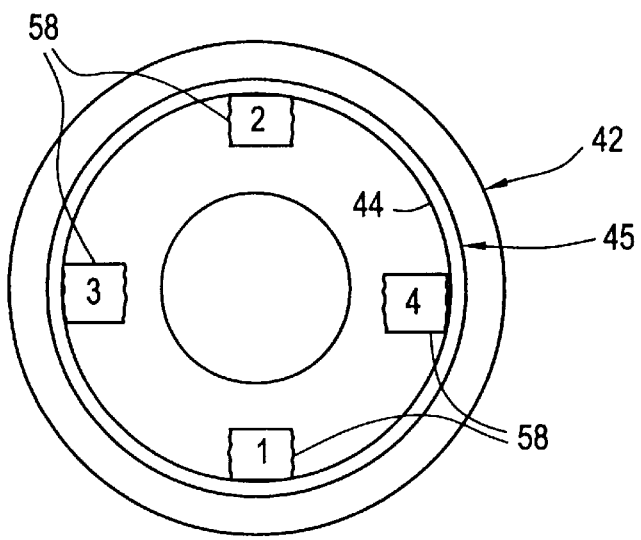
FIG. 3 illustrates a top view of a dispersion compensation optical waveguide device in accordance with the invention.

Applying a force to spool 34 proximate wound optical fiber 32, preferably comprises applying the force to flanges 42 proximate to an outermost layer 44 of wound optical fiber 32. It is preferred that outermost layer 44 is elastically secured with an outer resilient elastic layer 45, such as by coating the outermost layer 44 with 1 to 2 mm of resilient RTV silicon sealant adhesive applied with an applicator and allowed to fully cure to form outer elastic layer 45 which elastically secures outermost fiber layer 44. A flowable sealant, such as Dow Corning RTV Sealant 734, is preferably applied as a 1 mm thick coating with an acid brush. It is preferred to apply the force just radially inside of the outermost layer 44, such as at force application locations 46 in FIG. 2 and labels 58 in FIG. 3. It is less preferred to apply the force radially closer to center hub 40, such as at force application locations 48 in FIG. 2. The preferred method of applying force to spool 34 is by clamping, as shown in FIG. 1 and FIG. 2, with a clamp 36, such as a C-clamp, on flanges 42 so as to urge flanges 42 towards each other. The most preferred method of applying force is shown in FIG. 1 wherein spool 34 is clamped with a force limiting device 50 which provides a repeatable and consistent means of applying the force to the spool. Force limiting device 50 is preferably comprised of clamp 36 combined with a nut 51 fixedly secured, such as by welding, to the end of clamp screw 49, and a torque limiting device 52, such as a Utica® brand torque limiting screwdriver, which includes a nut driver for nut 51.

The method preferably comprises designating at least two separate force application locations on a flange 42 of spool 34 and applying the force to the spool at these two separate force application locations. Such application of force at these two separate force application locations can be performed both consecutively and concurrently.

Figure 8:
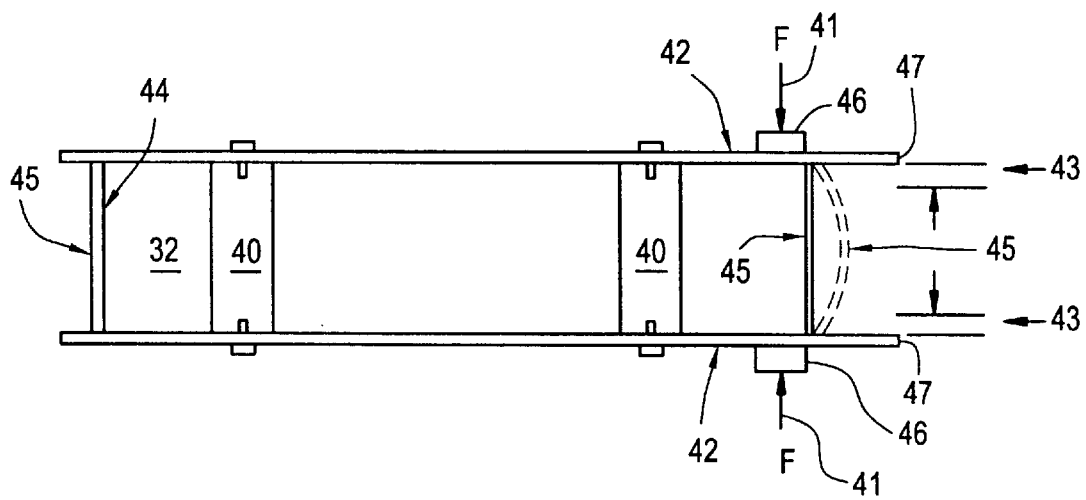
FIG. 8 illustrates a side view of a dispersion compensation optical waveguide device with a force applied thereto in accordance with the invention.

Preferably the step of applying a force to flanges 42, comprises applying a force sufficient to urge upper and lower flanges 42 together, as shown in FIG. 8, so as to squeeze optical fiber 32 between the flanges and radially outward from center hub 40. Force (F) shown in FIG. 8 as force arrows 41 is sufficient to displace flanges 42 the displacement distance 43 and to urge outer elastic layer 45, outermost fiber layer 44, and wound optical fiber 32 radially outward from central hub 40. Preferably the force F is in the range of 70 to 230 lb. of force, and more preferably in the range of 100 to 140 lb. of force. Force F should be sufficient to urge flange edges 47 closer together by a total displacement distance of about one quarter of an inch (each move a displacement distance 43 of about one eighth of an inch).

Preferably force is applied to spool 34 for a set period of force applying time, which is the time between applying the force and then relieving it, and the step of then measuring the polarization mode dispersion of the optical waveguide device after the force is relieved is delayed by a set period of relaxation time. Preferably the force applying time is at least 20 seconds, and most preferably is about 30 seconds. Preferably the set period of relaxation time is at least 2 minutes, and most preferably is about 3 minutes.

In the invention the steps of applying, relieving, measuring, and recording are repeated in a cycle N times to obtain a Maxwellian distribution of the plurality of recorded post mechanically perturbed polarization mode dispersion measurement values. The invention further includes extracting a mean polarization mode dispersion measurement value from said plurality of recorded post mechanically perturbed polarization mode dispersion measurement values which have a Maxwellian distribution. The step of extracting a mean polarization mode dispersion measurement value from said plurality of recorded post mechanically perturbed polarization mode dispersion measurement values preferably comprises extracting the mean polarization mode dispersion measurement value by statistically averaging the plurality of recorded post mechanically perturbed polarization mode dispersion measurement values.

The step of extracting a mean polarization mode dispersion measurement value from said plurality of recorded post mechanically perturbed polarization mode dispersion measurement values most preferably comprises extracting the mean polarization mode dispersion measurement value from a best fit Maxwellian distribution of the plurality of recorded post mechanically perturbed polarization mode dispersion measurement values. This most preferred step comprises using a non-linear least square fitting algorithm to obtain a Maxwellian distribution which has the best fit with the plurality of recorded post mechanically perturbed polarization mode dispersion measurement values. With this best fit step, the Maxwellian equation:

$$P(\Delta\tau) = \frac{A32}{\pi^2} \frac{\Delta\tau^2}{\langle\Delta\tau\rangle^2} \exp\left(-\frac{4\Delta\tau^2}{\pi\langle\Delta\tau\rangle^2}\right)$$

is utilized by the least square estimate algorithm to optimize the arbitrary scaling factor A and average of the distribution $\langle\Delta\tau\rangle$ to obtain the minimal difference between a best fitting Maxwellian distribution and the raw date distribution, which will be the best fit Maxwellian distribution. The mean polarization mode dispersion measurement value is then extracted from this best fit Maxwellian distribution.

In the invention the steps of applying, relieving, measuring, and recording are repeated in a cycle N times so that statistically averaging the recorded post mechanically perturbed polarization mode dispersion measurement values provides an average polarization mode dispersion value wherein the statistical distribution of the N number of measurement values is characteristic of a Maxwellian distribution. Preferably the method comprises obtaining at least about 15 recorded post mechanically perturbed polarization mode dispersion measurement values.

The number N is preferably in the range of 12 to 25, and most preferably 15 to 20.

In the practice of the invention the plurality of recorded post mechanically perturbed polarization mode dispersion measurement values have a Maxwellian distribution when in accordance to the Kolmogrov-Smirnov Test the Kolmogrov-Smirnov value D is less than or equal to 0.1. Most preferably the Kolmogrov-Smirnov value D is less than or equal to 0.05. The Kolmogrov-Smirnov Test is described in *Numerical Recipes in C: The Art of Scientific Computing*, by William H. Press et al., Chapter 14, 1992, which is incorporated herein by reference.

In the invention it is preferred that the measuring of the polarization mode dispersion comprises measuring the polarization mode dispersion at more than one wavelength in the range from 1500 nm to 1560 nm in order to obtain the post mechanically perturbed polarization mode dispersion measurement value.

The invention further comprises a method of qualifying optical waveguide devices 30 for use in an optical telecommunications system in which polarization mode dispersion is managed and minimized, and includes the steps of providing a spool 34 comprised of a center hub 40 and at least one flange 42, and winding a length of dispersion compensating optical waveguide fiber 32 under tension around center hub 40 to obtain multiple overlapping layers of fiber 32 under tension. The invention further includes securing the wound length of fiber 32 so as to keep the fiber under tension on spool 34, such as by confinement of the output and input ends of the fiber and by sealing the outer most layer 44 with a material such as silicone gel sealant. The method further includes applying a repeatable consistent force to flange 42 proximate the outer layer 44 of the overlapping layers of wound fiber 32 and then terminating the application of force to flange 42.

The inventive method further comprises measuring a polarization mode dispersion value of the length of fiber 32 after terminating the application of force to the flange. The method comprises cyclically repeating the steps of applying, terminating, and measuring until the measured polarization mode dispersion values have a statistical distribution characteristic of a Maxwellian distribution.

Preferably the step of applying a force to the flange includes exciting the polarization modes of the wound fiber by clamping the flange with a force limiting device which limits the force applied to the flange. Preferably the method comprises cyclically repeating the applying, terminating, and measuring at least 15 times so that the statistical distribution of the polarization mode dispersion values have a Maxwellian distribution.

The preferred method includes carefully placing dispersion compensation module optical waveguide device 30 on clamp pedestal 54, ensuring that device 30 is not resting on the underwrap or overwrap input and output fibers 56. Labels 58 numbered one through four are then placed on upper flange 42 according to FIG. 3.

It should be ensured that the four support rods 60 on clamp pedestal 54 are not directly in line with the four numbered labels 58 on flange 42. Spool 34 should be secured to pedestal 54, such as by taping or mechanical fixtures, to keep it from shifting position.

Clamp(s) 36 should be placed in the taped location(s) corresponding with the current measurement test number as per the following measurement table.

Polarization Mode Dispersion Measurement Test Table

| Measurement # (N) | Force Application Location | Measurement Value Recorded as |
|---|---|---|
| 1 | 1 | PMD1 |
| 2 | 2 | PMD2 |
| 3 | 3 | PMD3 |
| 4 | 4 | PMD4 |
| 5 | 1,2 | PMD5 |
| 6 | 1,3 | PMD6 |
| 7 | 1,4 | PMD7 |
| 8 | 2,3 | PMD8 |
| 9 | 2,4 | PMD9 |
| 10 | 3,4 | PMD10 |
| 11 | 1,2,3 | PMD11 |
| 12 | 2,3,4 | PMD12 |
| 13 | 1,3,4 | PMD13 |
| 14 | 1,2,4 | PMD14 |
| 15 | 1,2,3,4 | PMD15 |

Clamp(s) 36 should have the screw facing upwards and the clamp should be placed directly over the wound fiber 32 and not over empty flanges. The outside of the clamp foot of clamp 36 should be in line with the outermost layer 44 of fiber 32, with no part of the clamp foot extending beyond the layers of fiber 32. The clamp force should not be applied radially outside outermost layer 44 and should be radially within elastic securing layer 45.

Torque screwdriver 52 is used to apply the force to spool 34 by placing torque screwdriver 52 on nut 51 of clamp(s) 36 and turning clockwise until the screwdriver clicks at the desired and set torque limit that corresponds with the desired force to be applied. 10 inch-pounds is the preferred torque limit setting for achieving the desired applied force in the preferred range of 100 to 140 lb. of force. The screwdriver should be allowed to click 5 to 6 times to insure proper force application.

Once all clamps specified for the current test of the above Test Table are applied and tightened, a timer is set for thirty (30) seconds. After the 30 seconds, the clamps are immediately removed in order to relieve and terminate the applied force.

Once all clamps are removed, a timer is set for three (3) minutes in order to allow the spool to rest untouched for 3 minutes.

Then the polarization mode dispersion measurement is made using PMD measuring device 38 such as Hewlett Packard's HP8509B. The measured value is recorded, and the cycle is repeated 15 times in accordance with the above Test Table.

An HP-8509 Lightwave Polarization Analyzer was used in measuring the polarization mode dispersion of a dispersion compensation module optical waveguide device (a Corning DCM-80, comprised of about 15 km of dispersion compensating fiber) 30 in accordance with the invention. FIG. 4 and FIG. 5 are wavelength vs. PMD measurements measured and recorded for the device in accordance with the invention. The difference in the plots of FIG. 4 and FIG. 5, which are for the same device 30, illustrate that the applying and relieving of the force to spool 34 excited different polarization dispersion modes of device 30 and provide different post mechanically perturbed polarization mode dispersion measurement values.

Figure 6:
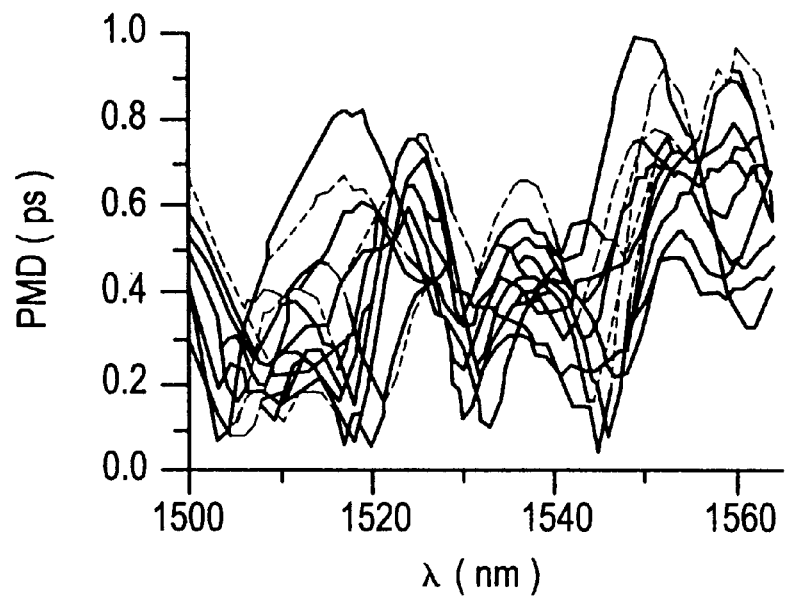
FIG. 6 is a composite plot showing a plurality of recorded post mechanically perturbed polarization mode dispersion measurement valves in accordance with the invention.
Figure 7:
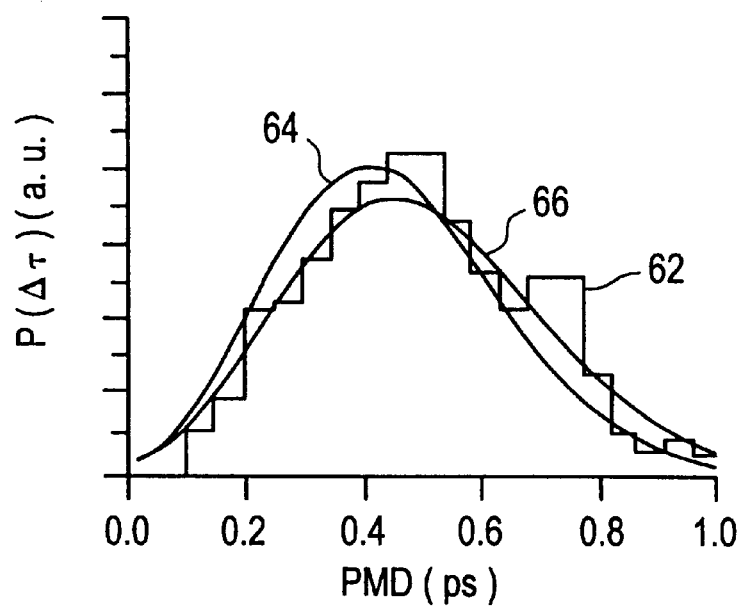
FIG. 7 shows the statistical distribution of the plurality of recorded post mechanically perturbed polarization mode dispersion measurement values characteristic of a Maxwellian distribution in accordance with the invention.

In FIG. 6 there are 15 wavelength vs. PMD measurements for the dispersion compensation module optical waveguide device (a Corning DCM-80, comprised of about 15 km of dispersion compensating fiber) 30 obtained with the inventive method of repeating the cycle of applying force, relieving the force, measuring the PMD, and recording the PMD, 15 times. FIG. 7 statistically presents the 15 post mechanically perturbed polarization mode dispersion measurement values recorded in FIG. 6. FIG. 7 provides the statistical average for the 15 recorded values and shows that the distribution of the recorded values is characteristic of a Maxwellian distribution. In FIG. 7 plot line 62 is the raw data distribution of the recorded post mechanically perturbed polarization mode dispersion measurement values, with plot line 64 showing the Maxwellian distribution characteristics of the measurement values using the data average of a 0.45 ps average polarization mode dispersion and plot line 66 further showing the Maxwellian distribution of the measurement values using the best fit Maxwellian distribution curve that then provides a 0.50 ps average polarization mode dispersion. The distribution of measurement values closely resembles a Maxwellian distribution, and the distribution of the measurement values is characteristic of the Maxwellian distribution of plot lines 64 and 66. In reference to FIG. 6 and FIG. 7, the average PMD<$\Delta\tau$>=0.45 ps was obtained by statistically averaging the 15 recorded post mechanically perturbed polarization mode dispersion measurement values wherein the statistical distribution of the values is characteristic of the Maxwellian distribution. In reference to FIG. 6 and FIG. 7, the average PMD<Δτ>=0.50 ps was extracted from the best fitted Maxwellian distribution plot 66 of the 15 recorded post mechanically perturbed polarization mode dispersion measurement values.

Figure 9:
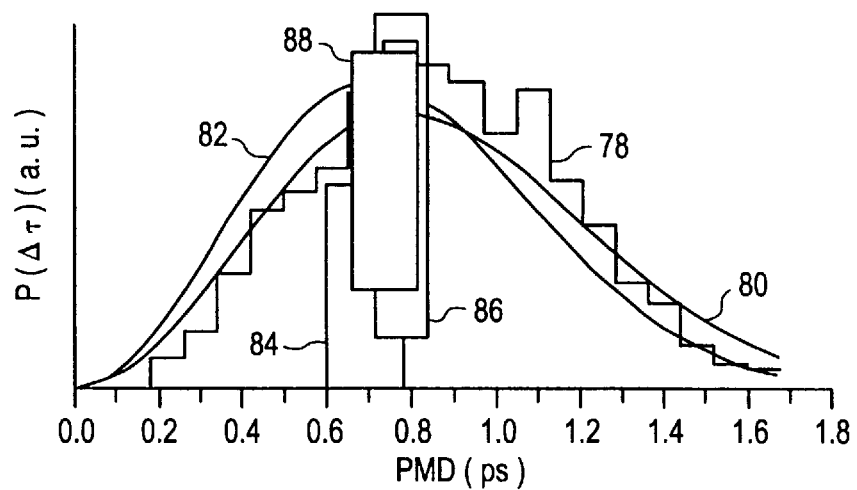
FIG. 9 is a plot which illustrates the effectiveness of the invention.

FIG. 9 shows the effectiveness of the invention in providing an average polarization mode dispersion value which is representative of its performance when used in a system over its lifetime and shows that a temperature variation is not an effective way of introducing perturbation. The inventive method was used on a dispersion compensating optical waveguide device 30 with 15 cycles of the invention repeated at normal room temperature (25° C.) and resulted in distribution plot 78, which has a best fit Maxwellian distribution at <Δτ>=0.88 ps, as shown with Maxwellian distribution plot 80. Maxwellian distribution plot 82 is for the data average <Δτ>=0.79 ps. In addition to testing the device 30 in accordance to the invention, the device was subjected to thermal variations of 10° C. centered at 0° C., 25° C., and 55° C. and the polarization mode dispersion was measured to determine the effectiveness of such a thermal perturbation. Average data block 84 shows the distribution of measurement values of 0° C. temperature, average data block 86 shows the distribution of 25° C. temperature, and average data block 88 shows the distribution at 55° C. temperature. This shows that a thermal perturbation gives multiple distributions with the temperature shifting the means of these multiple distributions. The inventive method is effective in providing a single distribution of PMD values wherein it is believed that the thermal perturbations provide unwanted multiple distributions with shifting mean values.

It will be apparent to those skilled in the art that various modifications and variations can be made in the methods of the present invention without departing from the spirit or scope of the invention. Thus, it is intended that the present invention cover the modifications and variations of this invention provided they come within the scope of the appended claims and their equivalents.

We claim:

1. A method of measuring a polarization mode dispersion optical performance characteristic of an optical waveguide device comprising the steps of:
   (a) providing an optical waveguide device comprised of a length of optical waveguide fiber wound under a tension on a spool;
   (b) applying a force to said spool proximate said wound optical waveguide fiber;
   (c) relieving said force applied to said spool proximate said wound optical waveguide fiber;
   (d) measuring the polarization mode dispersion of the optical waveguide device after said force is relieved to obtain a post mechanically perturbed polarization mode dispersion measurement value;
   (e) recording said post mechanically perturbed polarization mode dispersion measurement value;
   (f) repeating step (b), step (c), step (d), and step (e) to obtain a Maxwellian distribution of a plurality of recorded post mechanically perturbed polarization mode dispersion measurement values;
   (g) extracting a mean polarization mode dispersion measurement value from said plurality of recorded post mechanically perturbed polarization mode dispersion measurement values.

2. The method of claim 1 wherein said step of extracting a mean polarization mode dispersion measurement value from said plurality of recorded post mechanically perturbed polarization mode dispersion measurement values comprises extracting the mean polarization mode dispersion measurement value from a best fit Maxwellian distribution of the plurality of recorded post mechanically perturbed polarization mode dispersion measurement values.

3. The method of claim 1 wherein said step of extracting a mean polarization mode dispersion measurement value from said plurality of recorded post mechanically perturbed polarization mode dispersion measurement values comprises extracting the mean polarization mode dispersion measurement value by statistically averaging the plurality of recorded post mechanically perturbed polarization mode dispersion measurement values.

4. The method of claim 1 wherein said optical waveguide fiber is a dispersion compensating optical waveguide fiber having a negative waveguide dispersion.

5. The method of claim 1 wherein the step of providing an optical waveguide device comprised of a length of optical waveguide fiber wound under tension on a spool further comprises the step of providing a spool comprised of a center hub and first and second flanges wherein the length of fiber is wound under a tension around the center hub in a plurality of overlapping layers.

6. The method of claim 5 wherein the length of fiber is wound under a tension around the center hub in overlapping layers in order to provide a packing fraction greater than about 0.7.

7. The method of claim 5 wherein the step of providing a spool comprised of a center hub and first and second flanges wherein the length of fiber is wound under a tension around the center hub in said overlapping layers further comprises elastically securing an outer layer of said overlapping layers of said length of fiber wound around the center hub.

8. The method of claim 5 wherein said step of applying a force to said spool proximate said wound optical waveguide fiber further comprises applying a force to said first and second flanges of said spool, proximate to an outer most layer of said length of fiber wound around the center hub.

9. The method of claim 1 wherein the step of applying a force to said spool proximate said wound optical waveguide fiber further comprises clamping said spool.

10. The method of claim 9 wherein clamping said spool further comprises clamping said spool with a force limiting device which provides a repeatable and consistent means of applying said force to said spool.

11. The method of claim 1, further comprising, designating at least two separate force application locations on said spool proximate said wound optical waveguide fiber and applying said force to said spool at said at least two separate force application locations.

12. The method of claim 1, wherein said force is applied for a set period of force applying time and the step of measuring the polarization mode dispersion of the optical waveguide device after said force is relieved is delayed by a set period of relaxation time.

13. The method of claim 1, wherein repeating said steps of applying, relieving, measuring, and recording, to obtain a plurality of recorded post mechanically perturbed polarization mode dispersion measurement values comprises obtaining at least about 15 recorded post mechanically perturbed polarization mode dispersion measurement values.

14. The method of claim 1, wherein measuring the polarization mode dispersion of the optical waveguide device after said force is relieved to obtain a post mechanically perturbed polarization mode dispersion measurement value comprises measuring the polarization mode dispersion at more than one wavelength in the range from 1500 nm to 1560 nm to obtain said post mechanically perturbed polarization mode dispersion measurement value.

15. The method of claim 1, wherein said force is at least 70 pounds of force.

16. The method of claim 4 wherein said dispersion compensating optical waveguide fiber having a negative waveguide dispersion comprises a dispersion compensating optical waveguide fiber having a negative waveguide dispersion and a positive dispersion slope.

17. The method of claim 4 wherein said dispersion compensating optical waveguide fiber having a negative waveguide dispersion comprises a dispersion compensating optical waveguide fiber having a negative waveguide dispersion and a negative dispersion slope.

18. A method of qualifying optical waveguide devices for use in an optical telecommunications system in which polarization mode dispersion is managed and minimized, said method comprising:

providing a spool comprised of a center hub and at least one flange;

winding a length of dispersion compensating optical waveguide fiber under tension around the center hub of the spool to obtain multiple overlapping layers of optical waveguide fiber under tension;

elastically securing said wound length of fiber around the center hub of the spool;

applying a repeatable consistent force to said flange of said spool proximate an outer layer of the overlapping layers of the wound length of fiber;

terminating the application of force to said flange;

measuring a polarization mode dispersion value of said length of optical waveguide fiber after terminating the application of force to said flange;

cyclically repeating said applying, said terminating, and said measuring until the measured polarization mode dispersion values have a statistical distribution characteristic of a Maxwellian distribution.

19. The method of claim 18 wherein applying a repeatable consistent force comprises clamping the flange with a force limiting device which limits the force applied to the flange.

20. The method of claim 18 wherein cyclically repeating said applying, said terminating, and said measuring until the polarization mode dispersion of said length of optical waveguide fiber is statistically characterized by a Maxwellian distribution comprises cyclically repeating said applying, said terminating, and said measuring at least 15 times.

21. The method of claim 18 wherein elastically securing said wound length of fiber around the center hub of the spool comprises applying an elastic adhesive to an outer layer of the overlapping layers of the wound length of fiber.

* * * * *